United States Patent
Bacher et al.

(10) Patent No.: US 7,052,773 B2
(45) Date of Patent: May 30, 2006

(54) SILANE-MODIFIED POLYVINYL ALCOHOL MIXTURES

(75) Inventors: Andreas Bacher, Burghausen (DE);
Karl-Ernst Fickert, Altoetting (DE);
Theo Mayer, Julbach (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 8 days.

(21) Appl. No.: 10/463,380

(22) Filed: Jun. 17, 2003

(65) Prior Publication Data
US 2004/0013888 A1 Jan. 22, 2004

(30) Foreign Application Priority Data
Jul. 18, 2002 (DE) .................. 102 32 665

(51) Int. Cl.
*B32B 23/06* (2006.01)
*C08L 29/04* (2006.01)
*D21H 21/14* (2006.01)

(52) U.S. Cl. ................ 428/514; 524/501; 524/503

(58) Field of Classification Search ........... 428/514; 524/501, 503
See application file for complete search history.

(56) References Cited

FOREIGN PATENT DOCUMENTS

| DE | 35 19 575 C2 | 12/1985 |
|----|----|----|
| EP | 0 076 940 | 4/1983 |
| EP | 1 080 940 A2 | 3/2001 |
| EP | 1 127 706 A1 | 8/2001 |

OTHER PUBLICATIONS

Derwent Abstract corresponding to EP-A 76940 [AN 1983—F5318K].
Derwent Abstract corresponding to DE-C 3519575 [AN 1985-311751].
Patent Abstract of Japan, vol. 017, No. 327, corres. to JP-A 05032931.

*Primary Examiner*—D. S. Nakarani
(74) *Attorney, Agent, or Firm*—Brooks Kushman P.C.

(57) ABSTRACT

Silane-modified polyvinyl alcohol mixtures comprising:
a) a low molecular weight, silane-containing polyvinyl alcohol having a Höppler viscosity according to DIN 53015 as a 4% by weight aqueous solution of from 1 to 25 mPas, and
b) a higher molecular weight, silane-containing polyvinyl alcohol having a Höppler viscosity according to DIN 53015 as a 4% by weight aqueous solution of from 10 to 50 mPas, the silane-containing polyvinyl alcohol a) having a lower Höppler viscosity than the silane-containing polyvinyl alcohol b), are useful as non-dilatant polymeric binders for paper coating slips.

12 Claims, 1 Drawing Sheet

Plot of the viscosity against the shear gradient measured by capillary viscometry of paper coating slips for the production of inkjet coats having a solids content of 25%.

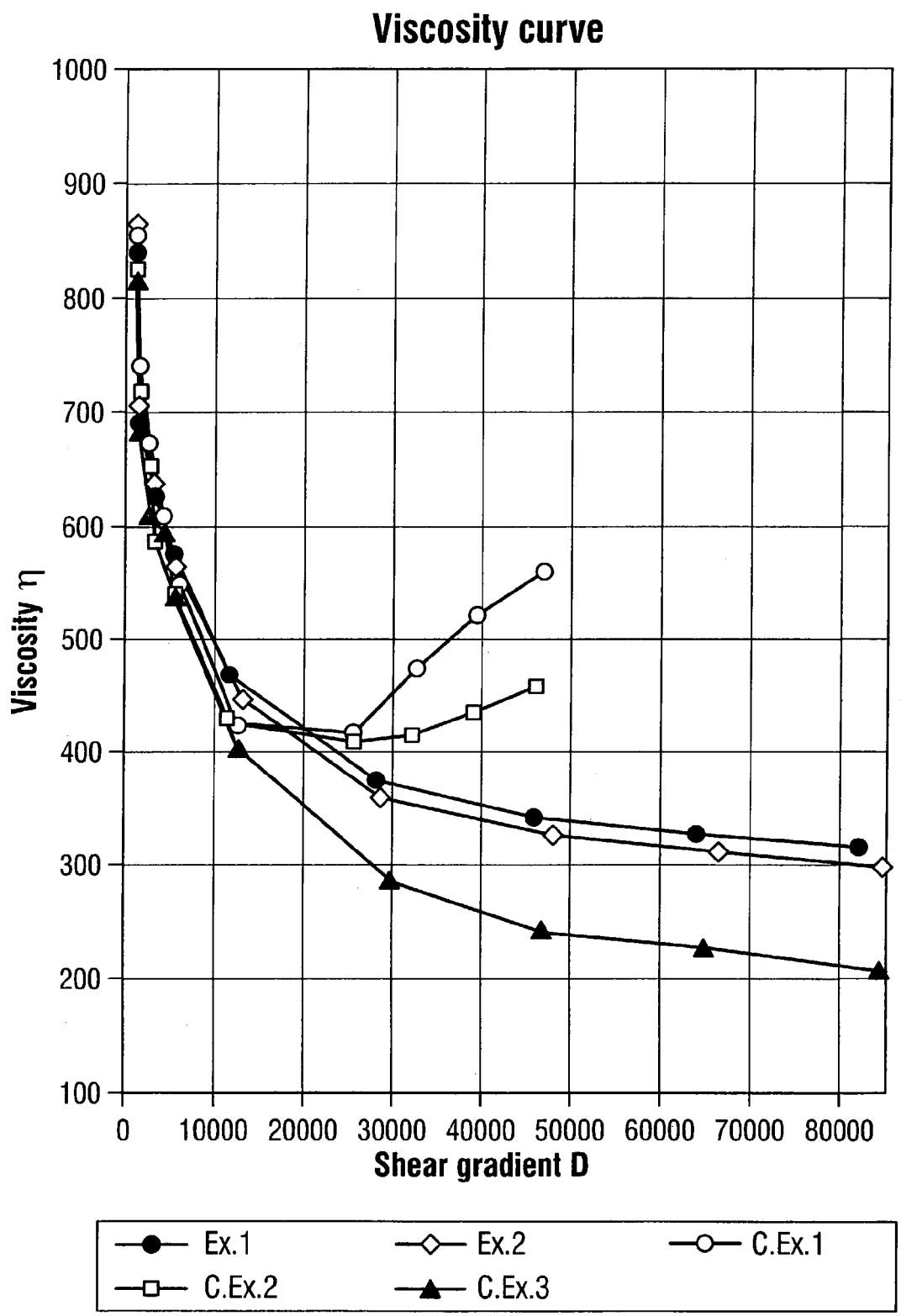
Fig. 1: Plot of the viscosity against the shear gradient measured by capillary viscometry of paper coating slips for the production of inkjet coats having a solids content of 25%.

US 7,052,773 B2

SILANE-MODIFIED POLYVINYL ALCOHOL MIXTURES

BACKGROUND OF THE INVENTION

1. Field of the Invention

The invention relates to silane-modified polyvinyl alcohol mixtures and their use in paper coating slips.

2. Background Art

Polyvinyl alcohols are used as cobinders in paper coating slips in order to improve the gloss and the brightness of the paper coating. The paper coats, in particular for inkjet papers, are exposed to a high mechanical load. It is therefore necessary for the coatings to be characterized by high abrasion resistance. Moreover, the formulation must ensure good ink absorption without the ink drop running or spreading.

EP-A 76940 describes silicon-containing polyvinyl alcohols which are used for paper coating. The silicon content is introduced either by subsequent silylation of polyvinyl alcohol or by means of copolymerization of ethylenically unsaturated, silane-containing comonomers with vinylestermonomers, and subsequent hydrolysis of the vinyl ester units.

EP-A 1127706 discloses paper coatings which are characterized by high water resistance, light stability, and heat stability, and are therefore quite suitable for use outdoors. This property profile is obtained by a combination of pigment, silanol-modified polyvinyl alcohol, and a film-forming polymer having a Tg<50° C.

Heat-sensitive recording papers having a coating which contains silicon compounds are disclosed in DE-C 3519575. The silicon compounds may be silicon-modified polyvinyl alcohol in combination with colloidal silica and/or amorphous silica.

EP-A 1080940 discloses a coating composition for the production of heat-sensitive recording materials or inkjet papers which contain ethylene/vinyl alcohol copolymers, silicon-modified vinyl alcohol polymers, or silicon-modified ethylene/vinyl alcohol polymers as one component, and an organotitanium compound as a further component.

SUMMARY OF THE INVENTION

It was an object of the present invention to develop a binder for paper coating slips, based on polyvinyl alcohol, which provides high abrasion resistance in the paper coat and can also be used in relatively high concentrations in aqueous solution. Moreover, it should be possible to prepare therewith paper coating formulations which exhibit shear-thinning viscosity behavior in the high shear range in combination with a high solids content of the coating slip. These and other objects were achieved by the use of a binder system containing two different silane-modified polyvinyl alcohols, one of low molecular weight and a low Höppler viscosity relative to a second, higher molecular weight silane-modified polyvinyl alcohol.

BRIEF DESCRIPTION OF THE DRAWINGS

FIG. 1: Plot of the viscosity against shear gradient measured by capillary viscometry of paper coating slips for the production of inkjet coats having a solids content of 25%.

DETAILED DESCRIPTION OF THE PREFERRED EMBODIMENT(S)

The invention relates to silane-modified polyvinyl alcohol mixtures comprising a) a low molecular weight, silane-containing polyvinyl alcohol having a Höppler viscosity (according to DIN 53015 as a 4% by weight aqueous solution) of from 1 to 25 mPas, and b) a higher molecular weight, silane-containing polyvinyl alcohol having a Höppler viscosity (according to DIN 53015 as a 4% by weight aqueous solution) of from 10 to 50 mPas, the silane-containing polyvinyl alcohol a) having a lower Höppler viscosity than the silane-containing polyvinyl alcohol b).

Suitable silane-modified polyvinyl alcohols are completely hydrolyzed or partly hydrolyzed vinyl ester polymers having a degree of hydrolysis of from 75 to 100 mol % and a content of silane-containing comonomer units of from 0.01 to 10 mol %. The completely hydrolyzed vinyl ester polymers preferably have a degree of hydrolysis of from 97.5 to 100 mol %, more preferably from 98 to 99.5 mol %. The partly hydrolyzed polyvinyl esters preferably have a degree of hydrolysis of from 80 to 95 mol %, more preferably from 86 to 90 mol %. The Höppler viscosity serves as a measure of the molecular weight, and thus of the degree of polymerization of the partly or completely hydrolyzed, silanized vinyl ester polymers.

The partly or completely hydrolyzed, silanized vinyl ester polymers are obtainable by means of free radical polymerization of one or more vinyl esters of straight-chain or branched alkanecarboxylic acids having 1 to 18 C atoms in the presence of ethylenically unsaturated, silane-containing comonomers, and subsequent hydrolysis of the silane-containing vinyl ester polymers thus obtained.

Suitable vinyl esters are vinyl esters of straight-chain or branched carboxylic acids having 1 to 18 C atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 5 to 15 C atoms, for example VeoVa9$^R$ or VeoVa10$^R$ (trade names of Resolution). Vinyl acetate is particularly preferred.

In addition to the vinyl ester units, one or more methacrylates or acrylates of alcohols having 1 to 15 C atoms, olefins, dienes, vinylaromatics or vinyl halides can optionally also be copolymerized. Suitable (meth)acrylic acid esters are esters of straight-chain or branched alcohols having 1 to 15 C atoms. Preferred (meth)acrylates are methyl acrylate, methyl methacrylate, ethyl acrylate, ethyl methacrylate, propyl acrylate, propyl methacrylate, n-butyl acrylate, isobutyl acrylate, tert-butyl acrylate, n-butyl methacrylate, isobutyl methacrylate, tert-butyl methacrylate, 2-ethylhexyl acrylate and norbornyl acrylate. Methyl acrylate, methyl methacrylate, n-butyl acrylate, isobutyl acrylate, tert-butyl acrylate, 2-ethylhexyl acrylate and norbornyl acrylate are particularly preferred. Suitable dienes are 1,3-butadiene and isoprene. Examples of polymerizable olefins are ethene and propene. As vinylaromatics, styrene and vinyltoluene are examples of monomers which can be incorporated as polymerized units. From the vinyl halides, vinyl chloride, vinylidene chloride or vinyl fluoride, are employed, preferably vinyl chloride. The proportion of these comonomers is such that the proportion of vinyl ester monomer is greater than 50 mol % in the vinyl ester polymer.

Further comonomers, preferably in a proportion of from 0.1 to 25 mol % may optionally also be present. Examples of these are ethylenically unsaturated mono-and dicarboxylic acids, preferably acrylic acid, methacrylic acid, fumaric acid and maleic acid; ethylenically unsaturated carboxamides and carbonitriles, preferably N-vinylformamide, acrylamide and acrylonitrile; mono-and diesters of fumaric acid and maleic acid, such as their diethyl and diisopropyl esters; maleic anhydride; and ethylenically unsaturated sulfonic acids and salts thereof, preferably vinylsulfonic acid and 2-acrylamido-2-methylpropanesulfonic acid. Further examples are precrosslinking comonomers, such as polyethylenically unsaturated comonomers, for example divinyl adipate, diallyl maleate, allyl methacrylate, butanediol diacrylate or triallyl cyanurate, or postcrosslinking comonomers, for example acrylamidoglycolic acid (AGA), methyl methylacrylamidoglycolate (MAGME), N-methylolacrylamide (NMA), N-methylolmethacrylamide, N-methylolallylcarbamate, and ethers and esters, such as the isobutoxy ether or ester of N-methylolacrylamide, of N-methylolmethacrylamide or of N-methylolallylcarbamate.

Suitable ethylenically unsaturated, silane-containing monomers are, for example, ethylenically unsaturated silicon compounds of the general formula $R^2SiR^3_{0-2}(OR^4)_{1-3}$, in which $R^2$ is $CH_2=CR^5-(CH_2)_{0-3}$ or $CH_2=CR^5CO_2(CH_2)_{1-3}$, $R^3$ is $C_1$- to $C_3$-alkyl radical, $C_1$- to $C_3$-alkoxy radical or halogen, preferably Cl or Br, $R^4$ is a straight-chain or branched, unsubstituted or substituted alkyl radical having 1 to 12 C atoms, preferably 1 to 3 C atoms, or is an acyl radical having 2 to 12 C atoms, it being possible for $R^4$ to be interrupted by an ether group; and $R^5$ is H or $CH_3$.

Preferred ethylenically unsaturated, silane-containing monomers are γ-acryloyl-or γ-methacryloyloxypropyltri(alkoxy)silanes, γ-methacryloyloxymethyl-tri(alkoxy)silanes, γ-methacryloyloxypropylmethyldi(alkoxy)silanes; vinylsilanes such as vinylalkyldi(alkoxy)silanes and vinyltri(alkoxy)silanes, the alkoxy groups of which may be, for example, a methoxy, ethoxy, methoxyethylene, ethoxyethylene, methoxypropylene glycol ether or ethoxypropylene glycol ether radical. Examples of preferred silane-containing monomers are 3-methacryloyloxypropyltrimethoxy-silane, 3-methacryloyloxypropylmethyldimethoxysilane, vinyltrimethoxysilane, vinylmethyldimethoxysilane, vinyltriethoxysilane, vinylmethyldiethoxysilane, vinyltripropoxysilane, vinyltriisopropoxysilane, vinyltris(1-methoxy)isopropoxysilane, vinyltributoxysilane, vinyltriacetoxysilane, methacryloyloxymethyltrimethoxysilane, 3-methacryloxypropyltris(2-methoxyethoxy)silane, vinyltrichlorosilane, vinylmethyldichlorosilane, vinyltris(2-methoxyethoxy)silane, trisacetoxyvinylsilane, allylvinyltrimethoxysilane, allyltriacetoxysilane, vinyldimethylmethoxysilane, vinyldimethylethoxysilane, vinylmethyldiacetoxysilane, vinyldimethylacetoxysilane, vinylisobutyldimethoxysilane, vinyltriisopropoxysilane, vinyltributoxysilane, vinyltrihexyloxysilane, vinylmethoxydihexyloxysilane, vinyltrioctyloxysilane, vinyldimethoxyoctyloxysilane, vinylmethoxydioctyloxysilane, vinylmethoxydilauryloxysilane, vinyldimethoxylauryloxysilane, and polyethylene glycol-modified vinylsilanes.

Preferred silanes are in general vinyltrimethoxysilane, vinylmethyldimethoxysilane, vinyltriethoxysilane, vinylmethyldiethoxysilane, vinyltris(1-methoxy)isopropoxysilane, methacryloyloxypropyltris(2-methoxyethoxy)silane, 3-methacryloyloxypropyltrimethoxysilane, 3-methacryloxypropylmethyldimethoxysilane and methacryloyloxymethyltrimethoxysilane and mixtures thereof.

Suitable ethylenically unsaturated, silane-containing monomers are also (meth)acrylamides which contain silane groups is of the formula $CH_2=CR^6-CO-NR^7-R^8-SiR^9_m-(R^{10})_{3-m}$ in which m is 0 to 2; $R^6$ is either H or a methyl group, $R^7$ is H or an alkyl group having 1 to 5 C atoms; $R^8$ is an alkylene group having 1 to 5 C atoms or a bivalent organic group in which the carbon chain is interrupted by an O or N atom; $R^9$ is an alkyl group having 1 to 5 C atoms; and $R^{10}$ is an alkoxy group having 1 to 40 C atoms, which may be substituted by further heterocycles, preferably O or N. In monomers in which 2 or more $R^6$ or $R^{10}$ groups occur, these may be identical or different. The (meth)acrylamidoalkylsilanes are also preferably copolymerized in an amount of from 0.01 to 10.0% by weight, more preferably from 0.01 to 1.0% by weight, based in each case on the total weight of the comonomers.

Examples of such (meth)acrylamidoalkylsilanes are: 3-(meth)acrylamidopropyltrimethoxysilanes, 3-(meth)acrylamido-propyltriethoxysilanes, 3-(meth)acrylamidopropyltri(β-methoxyethoxy)silanes, 2-(meth)acrylamido-2-methylpropyltrimethoxysilanes, 2-(meth)acrylamido-2-methylethyltrimethoxysilanes, -(2-(meth)acrylamidoethyl)aminopropyltrimethoxysilanes, 3-(meth)acrylamidopropyltriacetoxysilanes, 2-(meth)acrylamidoethyltrimethoxysilanes, 1-(meth)acrylamidomethyltrimethoxysilanes, 3-(meth)acrylamidopropylmethyldimethoxysilanes, 3-(meth)acrylamidopropyldimethylmethoxysilanes, 3-(N-methyl-(meth)acrylamido)propyltrimethoxysilanes, 3-((meth)acrylamido-methoxy)-3-hydroxypropyltrimethoxysilanes, 3-((meth)acrylamidomethoxy)propyl-trimethoxysilanes, N,N-dimethyl-N-trimethoxysilylpropyl-3-(meth)acrylamido-propylammonium chloride and N,N-dimethyl-N-trimethoxysilylpropyl-2-(meth)acrylamido-2-methylpropylammonium chloride.

The vinyl ester polymers can be prepared in a known manner by means of polymerization; preferably by mass polymerization, suspension polymerization or polymerization in organic solvents, more preferably in organic solution. Suitable solvents are, for example, methanol, ethanol, propanol and isopropanol. The polymerization is carried out under reflux at a temperature of from 55° C. to 100° C. and is initiated by means of free radicals by adding customary initiators. Examples of customary initiators are percarbonates such as cyclohexyl peroxydicarbonate, and peresters such as tert-butyl perneodecanoate or tert-butyl perpivalate.

The monomers can be initially introduced in total, metered in total, or initially introduced in portions with the remainder metered in after initiation of the polymerization. The metering operations can be carried out separately with respect to space and time, or some or all of the metered components can be metered in preemulsified form.

The molecular weight of the two components of the silane-modified polyvinyl alcohol mixtures can be established by methods known to a person skilled in the art, for example, by polymerization in the presence of molecular weight regulators. Suitable regulators include, for example, alcohols such as ethanol or isopropanol, aldehydes such as acetaldehyde or propionaldehyde, and silane-containing regulators such as mercaptosilanes, for example 3-mercaptopropyltrimethoxysilane.

The hydrolysis of the vinyl ester polymers is effected in a manner known per se, for example by the belt or kneader method or in a stirred vessel, in the alkaline or acidic range established by addition of acid or base. Preferably, the solid vinyl ester resin is taken up in alcohol, for example methanol, a solids content of from 15 to 70% by weight being established. The hydrolysis is preferably an alkaline hydrolysis, for example by adding a base such as NaOH, KOH or $NaOCH_3$. The base is generally used in an amount of from 1 to 5 mol % per mole of ester units. The hydrolysis is conveniently carried out at temperatures of from 30° C. to 70° C. After the hydrolysis is complete, the solvent is distilled off and the polyvinyl alcohol is obtained as a powder. However, the polyvinyl alcohol can also be obtained as aqueous solution by gradual addition of water while the solvent is being removed by distillation.

The silane-modified polyvinyl alcohol mixtures are prepared by preparing an aqueous solution of the components a) and b). The weight ratio of low molecular weight, silane-containing polyvinyl alcohol a) to the higher molecular weight, silane-containing polyvinyl alcohol b) may be from 1:99 to 99:1, preferably 30:80 to 90:10, more preferably from 50:50 to 85:15.

The silane-modified polyvinyl alcohol mixtures are suitable, optionally in combination with further binders and additives, for formulating paper coating slips. The formulations for paper coating slips are known to a person skilled in the art. In general, from 10 to 50% by weight of the polyvinyl alcohol binder (solid), based on the total solids content of the formulation, are used. In the present invention, the silane-containing polyvinyl alcohols can be used as sole binders or as cobinders with additional binders such as polyvinyl alcohol, starch, and/or polymer dispersions such as styrene/butadiene latices or polyacrylate emulsions. Further additives are pigments and fillers such as silica and titanium dioxide, antifoams, and dispersants.

The silane-modified polyvinyl alcohol mixtures give paper coating slips which are distinguished by excellent abrasion resistances. Furthermore, these mixtures can be used to prepare solutions having a very high polyvinyl alcohol concentration of up to 15% by weight. Moreover, the coating slips obtained thereby exhibit shear thinning viscosity behavior in the high shear range ($\gamma > 10^4$ s$^{-1}$) at a high solids content of the coating slip, and thus have a considerable advantage in the application of coating slips having such a high solids content.

EXAMPLES

Preparation of a Higher Molecular Weight Polyvinyl Alcohol Copolymer:

612 g of water, 61.2 mg of copper(II) acetate and 61.2 g of a 5% strength polyvinylpyrrolidone solution (PVD-K90) in water were initially introduced under nitrogen into a thermostated laboratory apparatus having a capacity of 2.5 liters. A solution of 620 mg of tert-butyl per-2-ethylhexanoate (TBPEH 99% strength in water), 322 mg of tert-butyl perneodecanoate (Pergan PND 95% strength in water), 4.9 g of vinyltriethoxysilane, 48.9 g of isopropenyl acetate and 42.8 g of isopropanol in 612 g of vinyl acetate were run in while stirring. The reactor was heated to 51.5° C. and, after the reaction had diminished, was heated stepwise to 75° C. This temperature was maintained for a further 2 hours, after which cooling was carried out. The resulting polymer beads were filtered off with suction, washed thoroughly with water and dried.

In a laboratory reactor having a capacity of 2.5 liters, 90 g of polymer beads were dissolved in 810 g of methanol at 50° C. The solution was cooled to 30° C., a layer of 500 g of methanol was introduced on top with the stirrer stationary, and the methanolic NaOH was immediately added (10 g of 46% aqueous NaOH, dissolved in 90 g of methanol) and the stirrer was activated.

The solution became increasingly turbid. During the gel phase, the stirrer was set to a higher speed in order to comminute the gel. After the gel phase, the reaction was allowed to continue for a further 2 hours, neutralization was effected with acetic acid and the solid product was filtered off, washed and dried. A completely hydrolyzed polyvinyl alcohol having a Höppler viscosity of 28 mPas (4% by weight in water) was obtained.

Preparation of a Low Molecular Weight Polyvinyl Alcohol Copolymer:

375.5 g of methanol, 2.47 g of vinyltriethoxysilane, 24.7 g of isopropenyl acetate and 309.1 g of vinyl acetate were initially introduced under nitrogen into a thermostated laboratory apparatus having a capacity of 2.5 liters. 785 mg of tert-butyl perpivalate were added while stirring and the batch was heated to 60° C. and maintained at 60° C. during the reaction. 15 min after the beginning of the reaction, a further 1.34 g of tert-butyl perpivalate were added. After a further 30 min, a mixture of 7.2 g of vinyltriethoxysilane, 72 g of isopropenyl acetate and 900 g of vinyl acetate was metered in over a period of 165 min at a rate of 383.7 ml/h. At the same time, a further 785 mg of tert-butyl perpivalate are added. 448 mg of tert-butyl perpivalate were added each time, at 75 min and 105 min after the beginning of the reaction, 224 mg after 135 min and 113 mg each time after 165 min, 195 min and 230 min after the start of the reaction.

270 min after the beginning of the reaction, 312 g of methanol were added to the batch. After a reaction time of 420 min, the batch was cooled and hydrolyzed. 265 g of the methanolic polyvinyl alcohol solution were diluted with a further 1,250 g of methanol in the laboratory reactor having a capacity of 2.5 liters. The solution was heated to 30° C. and methanolic NaOH was added (13.8 g of 46% aqueous NaOH, dissolved in 113 g of methanol).

The solution became increasingly turbid. During the gel phase, the stirrer was set to a higher speed in order to comminute the gel. After the gel phase, the reaction was allowed to continue for a further 2 hours, neutralization was effected with acetic acid and the gel formed was filtered off, washed and dried.

A completely hydrolyzed polyvinyl alcohol having a Höppler viscosity of 6 mPas (4% by weight in water) was obtained.

Example 1

Mixture of the higher molecular weight with the low molecular weight silane-containing polyvinyl alcohol in the ratio of 1:2 (w/w).

Example 2

Mixture of the higher molecular weight with the low molecular weight silane-containing polyvinyl alcohol in the ratio of 1:4 (w/w).

Comparative Example 1

Commercial silane-containing polyvinyl alcohol having a Höppler viscosity of 25 mPas (4% by weight in water).

Comparative Example 2

Higher molecular weight silane-containing polyvinyl alcohol having a Höppler viscosity of 28 mPas (4% by weight in water).

Comparative Example 3

Low molecular weight silane-containing polyvinyl alcohol having a Höppler viscosity of 6 mPas (4% by weight in water).

Testing of Performance Characteristics:

The polyvinyl alcohols from the examples and comparative examples were tested in the following formulation:

Formulation of Coating Slip:

| Precipitated silica | 100 parts by weight |
| Polyvinyl alcohol | 35 parts by weight |
| Cationic dispersant | 5 parts by weight |
| Solids content of the coating slip: | 20–35% by weight |

The coating slip was tested on base paper: sized paper, about 80 g/m². The coat was 15 g/m².

Abrasion Test:

A 4.5 cm wide and 19 cm long coated paper strip was processed by means of 50 strokes in an abrasion tester from Prüfbau (Dr. Dürner system) with a black drawing paper applied to a stamp (500 g). The resulting black paper was then assessed visually, a rating of 1 representing the optimum.

Brightness:

The brightness was determined by means of reflectance measurement using an R 457 filter and was also visually assessed, a rating of 1 representing the optimum.

TABLE 1

| Coat analysis | Ex. 1 | Ex. 2 | C. Ex. 1 | C. Ex. 2 | C. Ex. 3 |
|---|---|---|---|---|---|
| Abrasion test | 1 | 1 | 1.5 | 1 | 4 |
| Brightness visual | 1 | 1 | 1 | 1 | 5 |
| Brightness R457 | 5.0 | 5.1 | 5.1 | 5.1 | 15.3 |

Viscosity:

The high-pressure capillary viscosity was determined using an HV 6 high-pressure capillary viscometer from Anton Paar (Austria) The results are presented in FIG. 1.

It is evident that paper coating slips which have a solids content of 25% and contain only high molecular weight, silane-containing polyvinyl alcohol (PVAL) (comparative examples 1 and 2) exhibit dilatent behavior. This leads to substantially lower processability on the coating machine and is therefore unacceptable. Coating slips comprising the mixtures according to the invention or comprising only the low molecular weight modified PVAL have the required viscosity behavior, which exhibit a gradual shear thinning as the viscosity continues to increase. However, paper coats produced using only the low molecular weight PVAL (comparative example 3) exhibit insufficient abrasion resistance and binding power.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A silane-modified polyvinyl alcohol mixture comprising:
    a) at least one silane-group-containing polyvinyl alcohol copolymer having a Höppler viscosity according to DIN 53015 as a 4% by weight aqueous solution of from 1 to 6 mPas, and
    b) a silane-group-containing polyvinyl alcohol copolymer having a Höppler viscosity according to DIN 53015 as a 4% strength by weight aqueous solution of from 28 to 50 mPas, the silane-group-containing polyvinyl alcohol copolymer a) having a lower Höppler viscosity than the silane-group-containing polyvinyl alcohol copolymer b).

2. The silane-modified polyvinyl alcohol mixture of claim 1, wherein the weight ratio of silane-group-containing polyvinyl alcohol copolymer a) to silane-group-containing polyvinyl alcohol copolymer b) is from 30:80 to 90:10.

3. The silane-modified polyvinyl alcohol mixture of claim 1, the silane units being obtained by copolymerization of at least one silane-containing, ethylenically unsaturated monomer selected from the group consisting of ethylenically unsaturated silicon compounds of the general formula $R^2SiR^3_{0-2}(OR^4)_{1-3}$, wherein $R^2$ is $CH^2=CR^5-(CH_2)_{0-3}$ or $CH_2=CR^5CO_2(CH_2)_{1-3}$, $R^3$ is $C_1$- to $C_3$-alkyl radical, $C_1$- to $C_3$-alkoxy radical or halogen, $R^4$ is a straight-chain or branched, unsubstituted or substituted alkyl radical having 1 to 12 C atoms or an acyl radical having 2 to 12 C atoms, $R^4$ optionally interrupted by an ether group, and $R^5$ is H, $CH_3$, or a (meth)acrylamide containing silane groups of the formula $CH_2=CR^6-CO-NR^7-R^8-SiR^9_m-(R^{10})_{3-m}$, in which m=0 to 2, $R^6$ is H or methyl, $R^7$ is H or an alkyl group having 1 to 5 C atoms, $R^8$ is an alkylene group having 1 to 5 C atoms or a bivalent organic group in which the carbon chain is interrupted by an O or N atom, $R^9$ is an alkyl group having 1 to 5 C atoms and $R^{10}$ is an alkoxy group which has 1 to 40 C atoms and is optionally substituted by further heterocycles.

4. The silane-modified polyvinyl alcohol mixture of claim 1, wherein said silane-group-containing polyvinyl alcohol copolymers are prepared by means of mass polymerization, suspension polymerization or polymerization in organic solvents, followed by hydrolysis of the polymers thus obtained.

5. The silane-modified polyvinyl alcohol mixture of claim 1, wherein at least one silane-group-containing polyvinyl alcohol copolymer contains moieties derived by hydrolysis of a silane-group-containing copolymer of vinyl acetate and isopropenyl acetate.

6. The silane-modified polyvinyl alcohol mixture of claim 1, wherein the silane is vinyltriethyoxysilane.

7. A silane-modified polyvinyl alcohol mixture comprising:
    a) at least one silane-group-containing polyvinyl alcohol copolymer having a Hoppler viscosity according to DIN 53015 as a 4% by weight aqueous solution of from 1 to less than 10 mPas, and
    b) a silane-group-containing polyvinyl alcohol copolymer having a Höppler viscosity according to DIN 53015 as a 4% strength by weight aqueous solution of from greater than 25 to 50 mPas, the silane-group-containing polyvinyl alcohol copolymer a) having a lower Höppler viscosity than the silane-group-containing polyvinyl alcohol copolymer b).

8. In a paper coating slip, wherein a polymeric binder is employed, the improvement comprising selecting as at least one polymeric binder, the silane-modified polyvinyl alcohol mixture of claim 1.

9. In a paper coating slip, wherein a polymeric binder is employed, the improvement comprising selecting as at least one polymeric binder, the silane-modified polyvinyl alcohol mixture of claim 8, wherein the weight ratio of silane-group-containing polyvinyl alcohol copolymer a) to silane-group-containing polyvinyl alcohol copolymer b) is from 50:50 to 85:15.

10. In a paper coating slip, wherein a polymeric binder is employed, the improvement comprising selecting as at least one polymeric binder, the silane-modified polyvinyl alcohol mixture of claim 2.

11. In a paper coating slip, wherein a polymeric binder is employed, the improvement comprising selecting as at least one polymeric binder, the silane-modified polyvinyl alcohol mixture of claim 3.

12. In a paper coating slip, wherein a polymeric binder is employed, the improvement comprising selecting as at least one polymeric binder, the silane-modified polyvinyl alcohol mixture of claim 4.

* * * * *